United States Patent
Willard

(10) Patent No.: US 7,257,922 B2
(45) Date of Patent: Aug. 21, 2007

(54) FISHING ROD SUPPORT

(76) Inventor: Douglas Willard, 47 Alderway Avenue, Brampton, Ontario (CA) L6Y 2B8

( * ) Notice: Subject to any disclaimer, the term of this patent is extended or adjusted under 35 U.S.C. 154(b) by 0 days.

(21) Appl. No.: 10/824,424

(22) Filed: Apr. 15, 2004

(65) Prior Publication Data

US 2005/0229471 A1    Oct. 20, 2005

(51) Int. Cl.
*A01K 97/10*    (2006.01)
(52) U.S. Cl. ............... 43/21.2; 248/523; 248/530
(58) Field of Classification Search ......... 43/21.2; 211/70.8; 248/523, 530
See application file for complete search history.

(56) References Cited

U.S. PATENT DOCUMENTS

| | | | |
|---|---|---|---|
| 2,200,183 A | | 5/1940 | Legg |
| 2,204,692 A | * | 6/1940 | Parisio ............ 248/530 |
| 2,311,823 A | * | 2/1943 | Gaskill ........... 43/21.2 |
| 2,626,770 A | | 1/1953 | Norman |
| 2,682,127 A | | 6/1954 | Binder |
| 2,704,412 A | * | 3/1955 | Davis ............ 43/21.2 |
| 2,890,847 A | | 6/1959 | Minton et al. |
| 3,570,793 A | * | 3/1971 | Shackel .......... 248/515 |
| 3,792,829 A | | 2/1974 | Fickett |
| 4,161,839 A | * | 7/1979 | Ward ............ 43/17 |
| 4,198,775 A | | 4/1980 | Leisner |
| 4,586,688 A | | 5/1986 | Hartman et al. |
| 4,656,774 A | * | 4/1987 | Terrill .......... 43/21.2 |
| 4,827,654 A | * | 5/1989 | Roberts ......... 43/21.2 |
| 5,210,971 A | * | 5/1993 | Efantis ......... 43/21.2 |
| 5,313,734 A | | 5/1994 | Roberts |
| 5,437,122 A | * | 8/1995 | Wilson ......... 43/21.2 |
| 5,446,989 A | * | 9/1995 | Stange et al. ... 43/21.2 |
| 5,460,306 A | * | 10/1995 | Rudd ............ 224/557 |
| 5,557,876 A | | 9/1996 | Parker |
| D388,153 S | | 12/1997 | Snyder |
| 5,921,014 A | * | 7/1999 | Lee ............. 43/21.2 |
| 6,089,524 A | * | 7/2000 | Lai ............. 248/535 |
| 6,269,584 B1 | * | 8/2001 | Peaschek ....... 43/21.2 |
| 6,318,018 B1 | | 11/2001 | Weaver |
| 6,438,889 B1 | * | 8/2002 | Handy ........... 43/21.2 |
| 6,547,203 B1 | * | 4/2003 | Willard ......... 248/530 |

FOREIGN PATENT DOCUMENTS

GB    2260249    *    4/1993

OTHER PUBLICATIONS

Webpage printout, undated, www.ram-mount.com/ramrod.htm.
Webpage printout, undated, www.tsuribaka.com/jp/fishing/rodholders/.

* cited by examiner

*Primary Examiner*—David Parsley

(57) ABSTRACT

A fishing rod support includes a restriction member configured to receive a portion of a fishing rod, wherein the restriction member is configured to substantially restrict rotational movement of the rod about a substantially vertical axis passing through the rod portion. The support is also provided with a retaining member configured to releasably inhibit vertical movement of the rod portion.

12 Claims, 6 Drawing Sheets

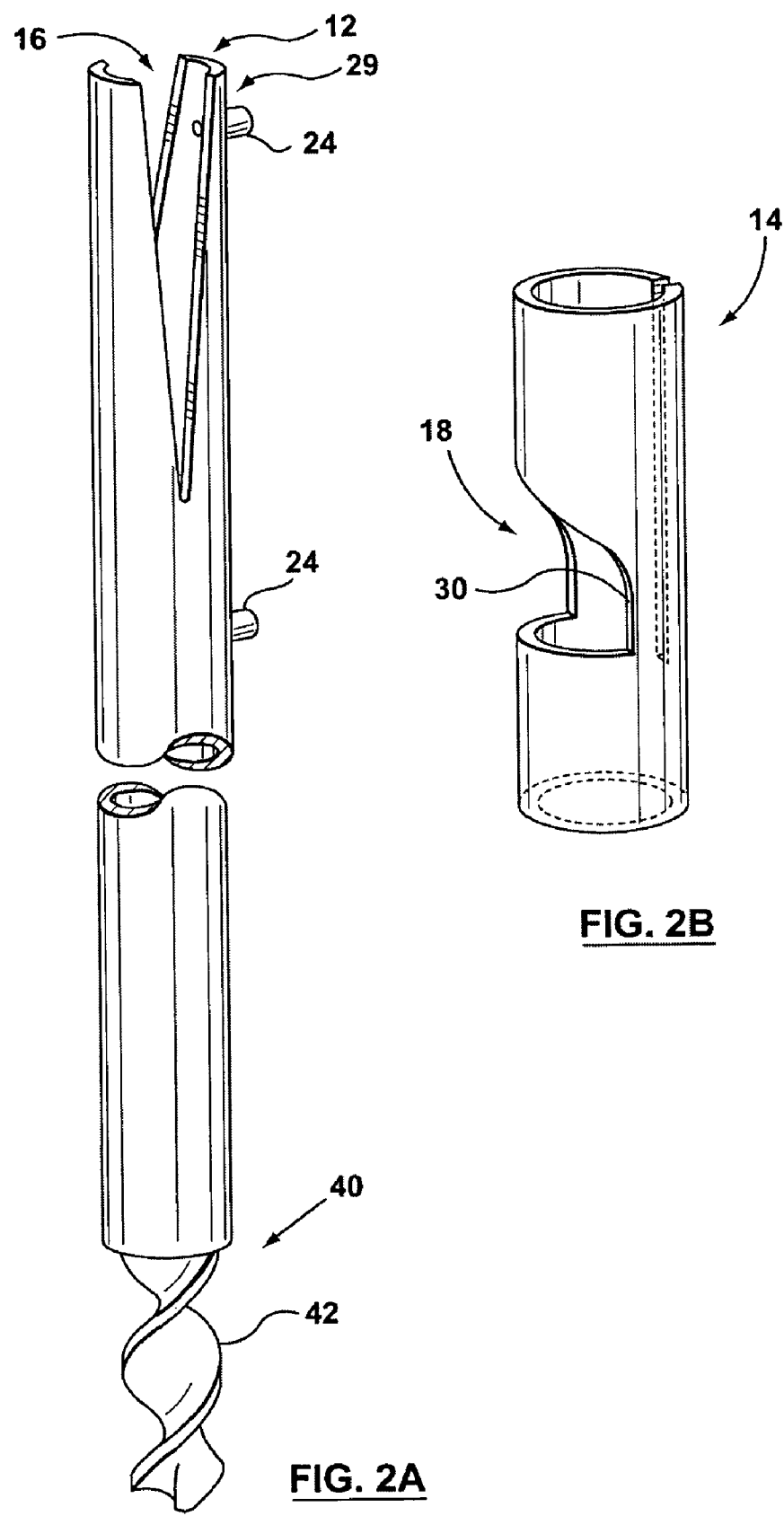

FISHING ROD SUPPORT

FIELD OF THE INVENTION

This invention relates to the field of fishing rod supports and holders.

BACKGROUND OF THE INVENTION

When fishing, it is often desirable to be able to set a fishing rod down periodically, while leaving the line and lure in the water in order to continue to attract fish. Standard fishing rod holders typically have a loop or sleeve within which the butt end of a fishing rod handle is axially inserted. However, as a result, such fishing rod holders require the handle to be axially withdrawn in reverse fashion before the user can regain proper control over the rod.

Accordingly, the inventor has recognized a need for a fishing rod support which facilitates removal while maintaining control over the rod

SUMMARY OF THE INVENTION

This invention is directed towards a fishing rod support which is adapted for supporting a fishing rod.

The support includes a restriction member configured to receive a portion of a rod, wherein the restriction member is configured to substantially restrict rotational movement of the rod about a substantially vertical axis passing through the rod portion. The support is also provided with a retaining member configured to releasably inhibit vertical movement of the rod portion.

Preferably, the retaining member is movable between a substantially closed position in which upward vertical movement of the rod portion is inhibited, and an open position in which upward vertical movement is substantially uninhibited.

BRIEF DESCRIPTION OF THE DRAWINGS

The present invention will now be described, by way of example only, with reference to the following drawings, in which like reference numerals refer to like parts and in which:

FIG. 2A is a side view of a restriction member of the support of FIG. 1A with the retaining member removed;

FIG. 2B is a side view of a retaining member of the support of FIG. 1A, with the restriction member removed;

DETAILED DESCRIPTION OF THE INVENTION

Figures 1A, 1B:
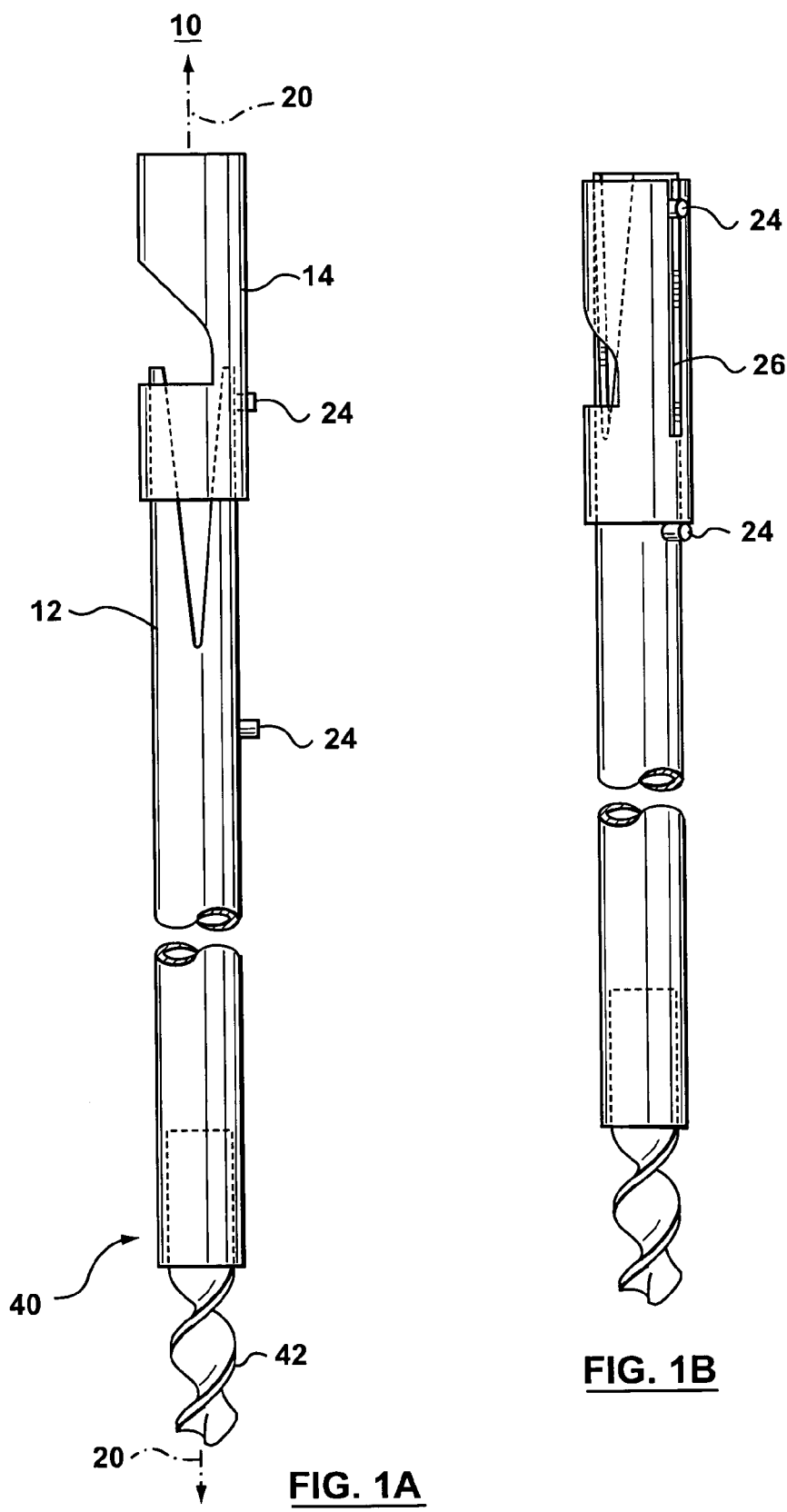
FIG. 1A is a side perspective view of a fishing rod support with the retaining member in the open position, made in accordance with the present invention.
FIG. 1B is a rear view of the fishing rod support of FIG. 1A.

Referring simultaneously to FIGS. 1A, 1B, 2A and 2B, illustrated therein is a fishing rod support, referred to generally as 10, made in accordance with the present invention. The support 10 includes a restriction member 12 and a retaining member 14.

The restriction member 12 may be substantially cylindrical and tubular, and is provided with a rod guide 16 which may take the form of a substantially vertical slot. The retaining member 14 may also be substantially tubular and configured to slidably fit over and receive the restriction member 12. The restriction member 12 and retaining member 14 may typically be made out of plastic or other sufficiently resilient material, including wire framing.

The retaining member 14 is provided with a mouth 18 in the front of the member 14. The restriction member 12 and the retaining member 14 are typically aligned about a substantially vertical support axis 20.

Figure 3:
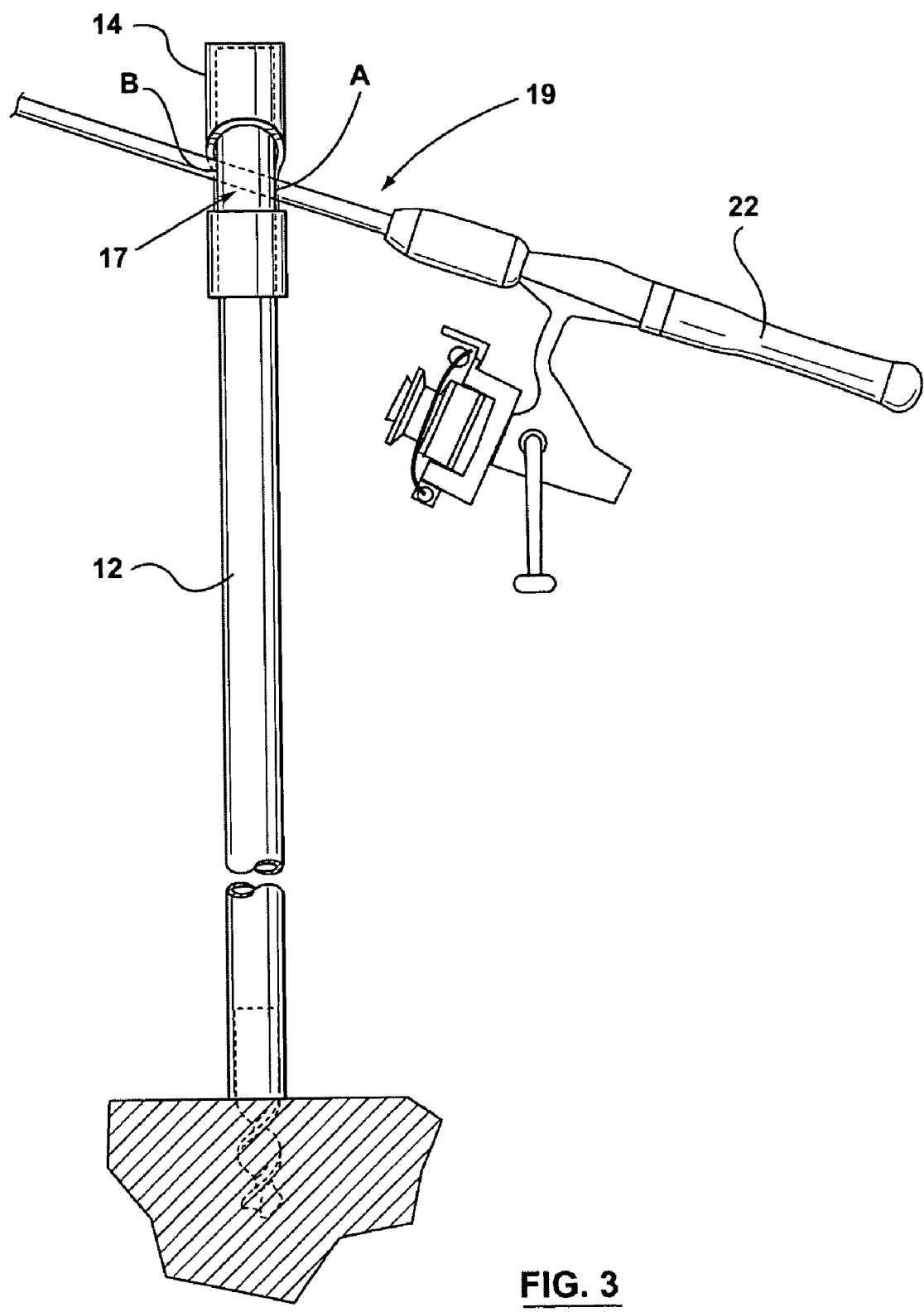
FIG. 3 is a front view of the support of FIG. 1A supporting a fishing rod, with the retaining member in the closed position.

Referring also now to FIG. 3, the rod guide 16 is configured to receive and support a rod portion 17 of a fishing rod 19 (substantially between points A and B). The guide 16 substantially limits rotational movement of the rod about the support axis 20.

The reel and handle portion 22 of the fishing rod 19 are relatively heavy and as a result, the force of gravity tends to pivot the rod 19 (and specifically the handle 22) substantially vertically in a downward direction about the rod portion 17, while the end (not shown) of the rod 19 remote from the handle 22, tends to pivot upwards in the opposite direction. The retaining member 14 is preferably sufficiently weighted to prevent unassisted or unintended vertical movement of the rod 19, while at the same time being sufficiently light such that the resistance may be overcome when the user intends to release the rod. Additionally, the binding force of the restriction member 14 against the retaining member 12 as the rod portion 17 tends to pivot in a substantially vertical arc and correspondingly pivots the restriction member 14 relative to the retaining member 12, also restricts the vertical movement of the rod 19.

The restriction member 12 is provided with guideposts 24 which are received within guide slot 26 in the retaining member 14. The guideposts 24 and guide slot 26 serve to couple the members 12, 14 together.

When the retaining member 14 is in the closed position (shown in FIG. 3) such that the fishing rod 19 is supported, the rod 19 is in an orientation which is similar to when the rod 19 is being held by a fisherman, and the fishing line and lure may remain in the water until the rod 19 is picked up again. As will be understood, a downward deflection of the end of the rod 19 which is remote from the handle 22, provides a visual indicator of a possible fish striking the lure.

Figure 4:
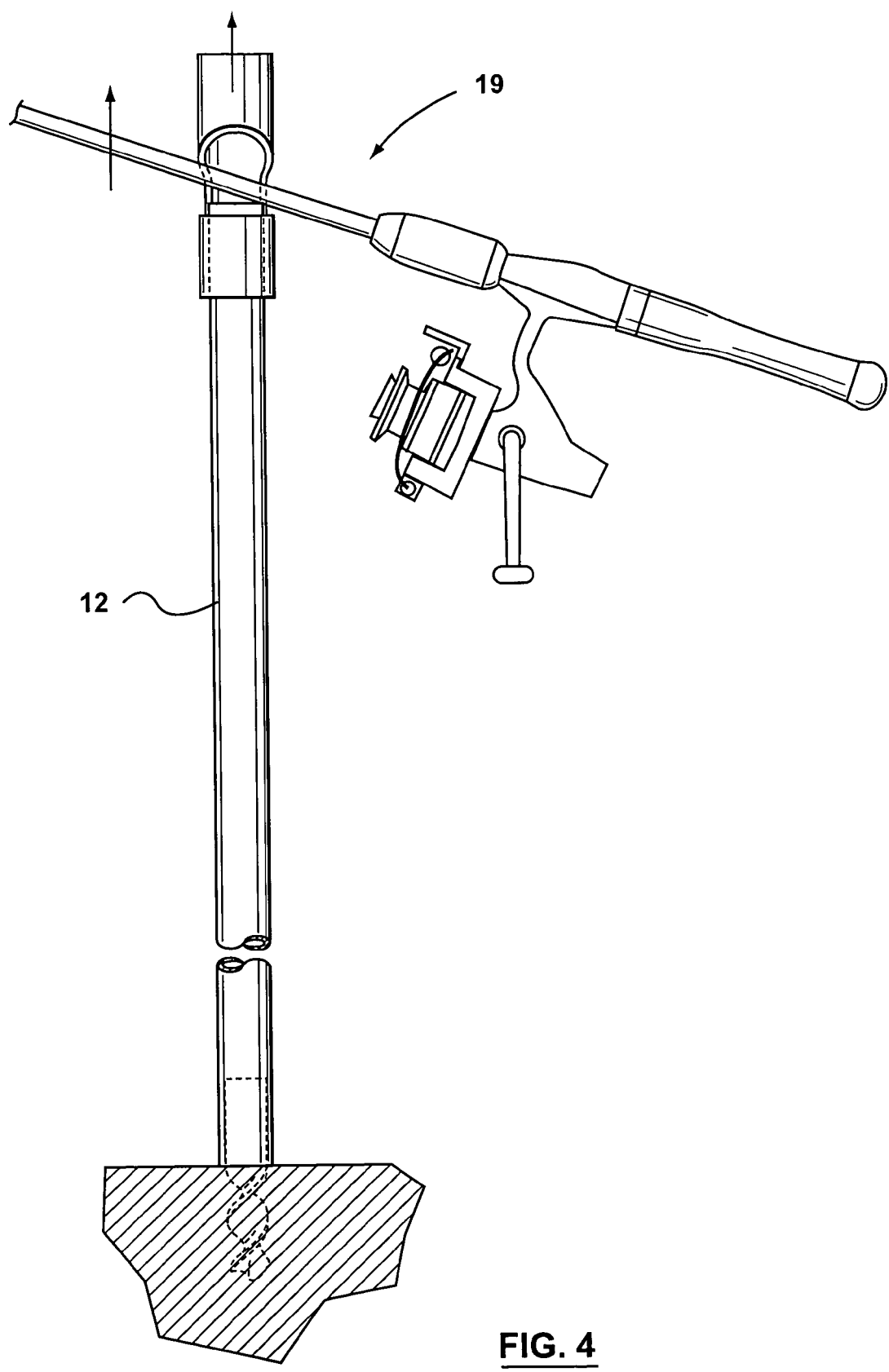
FIG. 4 is a front view of the support of FIG. 1A, where the rod has been moved upwardly, with the retaining member in the open position.

When the fisherman picks up the rod 19 to release it from the support 10, he grabs the fishing rod handle 22 and lifts the rod 19 in a generally upward vertical direction. This upward movement of the rod portion 17 pushes the retaining member 14 upward relative to the restriction member 12, until the retaining member 14 is in its open position, shown in FIG. 4. In the open position, the upper guidepost 24 abuts against the lower edge of the guide slot 26, and prevents further upward movement of the retaining member. As well, in the open position, the mouth 18 of the retaining member 14 is substantially beyond the top 29 of the restriction member 12.

As can be seen in FIG. 2B, the mouth 18 of the retaining member 14 is provided with a mouth guide 30, which at its lower portion is rearwardly disposed and forms a generally upward arc towards the front of the member 14. When the fishing rod 19 is raised by the user, and particularly once the retaining member has reached its open position with the upper guidepost 24 abutting against the lower edge of the guide slot 26, the mouth guide 30 directs the rod portion 17 towards the front of the mouth 18 and out of the support 10.

Proximate its lower end 40, the support 10 may also be provided with a ground engager 42, such as an auger bit, for enabling the support 10 to be secured to the ground. When used herein, "ground" is intended to include for example the bank of a river or lake as well as ice if the support is used when ice fishing. If the body 42 of the support 10 is sufficiently long (eg. 1-1.5 meters), the support 10 may be augured several centimeters (eg. 10-20 cm) into the bed of a shallow stream or river.

One advantage of the present design is that it allows the user to grab hold of the rod handle 22 and quickly jerk the rod 19 upwards to set the hook (in the event of a possible fish strike while the rod 19 is being supported by the support 10), in a generally fluid motion. This is not possible with prior art holders as illustrated in FIG. 5.

The support 10 is also provided with a mount for mounting the support 10 to an object when in use. The mount may take the form of a simple mounting bracket with bolts or other fasteners to attach the support 10 to a dock or side of a boat, for example. Similarly, the mount may be in the form of straps or other materials for tying the support to a post or similar solid object. As noted above, the mount may also take the form of the ground engager 42.

Figure 6:
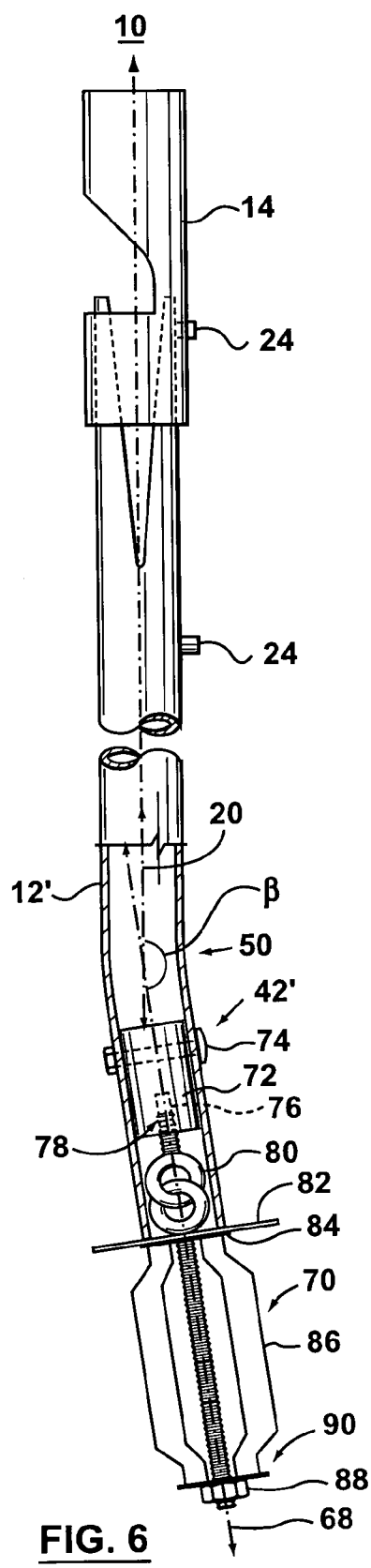
FIG. 6 is a side schematic cutaway view of an alternate embodiment of a fishing rod support made in accordance with the present invention, and adapted for seating within the prior art fishing rod holder of FIG. 5.

Referring now to FIG. 6, illustrated therein is an alternate embodiment of a support shown generally as 10'. As will be understood, many of the components of the alternate embodiment 10' correspond to those of the first embodiment 10. However, instead of having a substantially straight body 42 as in the first embodiment, the body 42' may include a bent neck portion 50.

Figure 5:
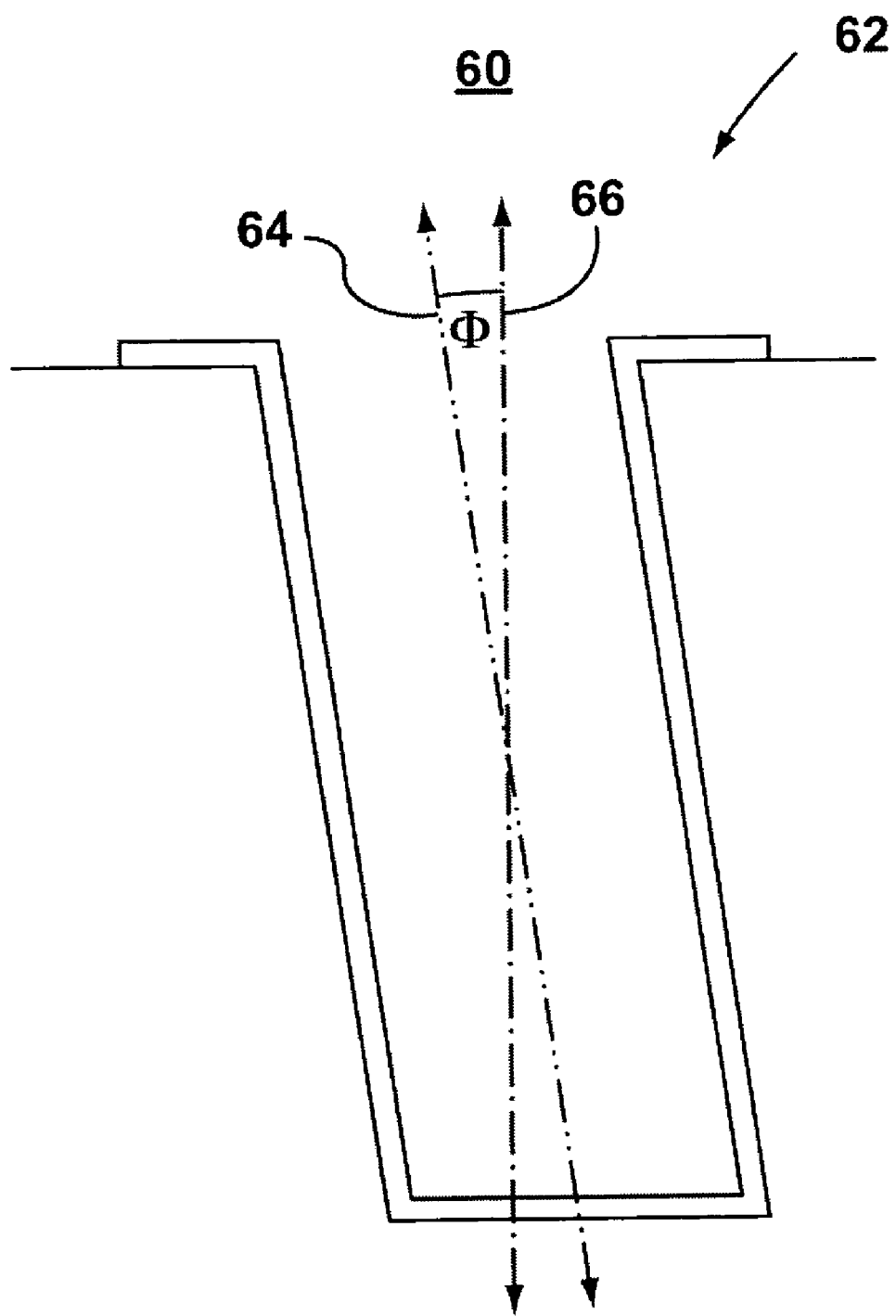
FIG. 5 is a side cutaway view of a prior art fishing rod holder.

As can be seen in FIG. 5, prior art holders 60 often have a generally tubular pocket 62 for receiving a fishing rod handle 22, with the pocket 62 aligned about a pocket axis 64. Typically, the pocket axis 64 is at an angle of deflection $\phi$ relative to a vertical axis 66. This angle of deflection $\phi$ is often between approximately 0° to 31°, although the angle can be greater.

The alternate support 10' is also provided with a mount 42' substantially aligned about a base axis 68 which has been adapted to friction fit within a pocket 62 of a prior art holder 60. The base of the support 10' may include an expansion anchor 70, having a solid round stock 72 disposed internally within the restriction member 12'. The stock 72 is typically secured to the restriction member 12' using a retaining pin 74 or other means such as an adhesive. The stock 72 may also be provided with a centrally disposed and aligned threaded blind hole 76 configured to receive a first threaded end 78 of a pair of interlocking threaded eye-bolts 80. The lower eye of the bolts 80 is seated against a large washer 82, which in turn is seated against a second washer 84 to which a flexibly biased framework of expansion wires 86 has been welded or otherwise attached. A nut with washer-style flange 88 is positioned at the bottom of and also attached to the framework 86, and threaded at the second threaded end 90 of the eye-bolts 80.

As will be understood, the framework 86 is inserted within the pocket 62 of a holder 60. The restriction member 12 may then be rotated, causing the nut 88 to thread upwardly on the eye-bolt 80, thereby compressing the framework and causing it to expand within the pocket 60. The member 12 may be rotated until a secure friction fit is established.

The bent neck portion 50 is configured to form a neck angle, in the body. Preferably, neck angle $\beta$ is substantially supplementary to the angle of deflection $\phi$ (ie. forming an angle of 180°), such that the support axis 20 is substantially vertical when the framework 86 is inserted within the pocket 62 and correctly aligned.

Thus, while what is shown and described herein constitute preferred embodiments of the subject invention, it should be understood that various changes can be made without departing from the subject invention, the scope of which is defined in the appended claims.

The invention claimed is:

1. A fishing rod support comprising:
   a) a substantially tubular restriction member comprising a substantially vertical, elongated member having a vertical, longitudinal axis, and a vertical opening from one end of said member, which vertical opening extends substantially along said vertical axis and is configured to receive a rod portion of a fishing rod, which fishing rod comprises an elongated handle section, an elongated rod portion, a reel section, and a reel support portion extending from said rod portion or said handle section to said reel section, and having a rod longitudinal axis extending along said handle section and said rod portion, so that said rod longitudinal axis of said rod portion is substantially perpendicular to said vertical axis of said restriction member and said vertical opening substantially limits rotational movement of said rod portion about said vertical axis; wherein said vertical opening is a substantially tapered opening extending from the upper end of said restriction member and tapering down to a point at a location disposed between the upper and lower ends of the restriction member, said restriction member having at least one guidepost extending perpendicularly from said restriction member; and
   b) a substantially tubular retaining member, co-axial to, and operatively coupled to the restriction member so that said retaining member slides along said vertical axis of said restriction member, and has a wall section which defines a horizontal opening along the side of said retaining member, said horizontal opening being an opening on one side of said retaining member and disposed at a position between the upper and lower ends of said retaining member, and a slot extending from or near the top of said retaining member to a point between the upper and lower ends of the retaining member, said slot of said retaining member engages the at least one guidepost of said restriction member, and wherein said retaining member is relatively movable between
      i) a substantially closed position in which said restriction member blocks said horizontal opening and prevents access to said vertical opening through said horizontal opening; and
      ii) an open position in which said restriction member does not block said horizontal opening, so that access to said vertical opening through said horizontal opening is available, and wherein when said retaining member is in said closed position, an upward vertical movement of said rod portion of said fishing rod along said vertical axis and in a direction perpendicular to said longitudinal axis of said rod portion, moves said retaining member from said closed position to said open position whereby said rod portion of said fishing rod can be removed from said vertical opening through said horizontal opening and thus removed from said fishing rod support.

2. The support as claimed in claim 1, further comprising a ground engager configured to releasably secure the support to the ground.

3. The support as claimed in claim 2, wherein the ground engager comprises an auger bit.

4. The support as claimed in claim 1, wherein the support further comprises a mount.

5. The support as claimed in claim 4, for use with a fishing rod handle holder having a pocket for receiving a fishing rod handle, wherein said pocket has a pocket axis which forms an angle of deflection to the vertical, and wherein said fishing rod support further comprises a neck portion, and said neck portion forms an angle which is substantially supplementary to said angle of deflection.

6. The support as claimed in claim 5, wherein the mount is configured to engage the pocket.

7. The support as claimed in claim 1 wherein said vertical opening is a V-shaped slot extending from one end of said restriction member.

8. The support as claimed in claim 1 wherein said horizontal opening is defined so as to have an upwardly angled upper surface so that said rod portion slides upwards and outwards when exiting from said restriction member.

9. The support as claimed in claim 1 having a plurality of guideposts.

10. The support as claimed in claim 1 wherein said horizontal opening on said retaining member is a substantially multiple curved opening.

11. The support as claimed in claim 1 wherein said slot on said retaining member extends to the top of said retaining member.

12. The support as claimed in claim 1 wherein said slot on said retaining member is located opposite the horizontal opening.

\* \* \* \* \*